United States Patent
Gute et al.

[15] 3,670,353
[45] June 20, 1972

[54] DEMAND VACUUM ACTUATED TAILGATE WIPER SYSTEM

[72] Inventors: Loren R. Gute; George W. Jackson, both of Dayton, Ohio

[73] Assignee: General Motors Corporation, Detroit, Mich.

[22] Filed: Oct. 27, 1970

[21] Appl. No.: 84,310

[52] U.S. Cl..........................................15/250.02, 15/250.1
[51] Int. Cl. .........................................................B60s 1/02
[58] Field of Search ....................15/250.01, 250.02, 250.03, 15/250.04, 250.1

[56] References Cited

UNITED STATES PATENTS 3,131,640   5/1964   Rohde et al.........................15/250.02

Primary Examiner—Peter Feldman
Attorney—W. E. Finken and W. A. Schuetz

[57] ABSTRACT

In a preferred form, this disclosure relates to a window cleaning system for cleaning a tailgate window of a station wagon vehicle. The window cleaning system includes a wiper unit having a window wiper which is supported by the tailgate for oscillatory movement across the outer surface of the window through inboard and outboard strokes and a drive means for moving the wiper through its strokes. The drive means includes a fluid motor for moving the wiper through its outboard stroke when fluid pressure is communicated thereto and a spring means for moving the wiper through its inboard stroke when fluid pressure is not communicated to the fluid motor. The window cleaning system also includes a washer unit having a washer nozzle for directing the washer fluid against the window and a manually actuatable pump means for delivering washer fluid under pressure to the washer nozzle. The window cleaning system further includes a coordinator means which is responsive to pressurized fluid being delivered by the pump means to cause a source of fluid pressure to be communicated to the fluid motor whereby actuation of the pump means causes the wiper to be actuated through its outboard stroke and washer fluid to be squirted against the window.

9 Claims, 8 Drawing Figures

INVENTORS
Loren R. Gute, &
BY George W. Jackson
W.A. Schuetz
ATTORNEY

INVENTORS
Loren R. Gute, &
BY George W. Jackson
W. A. Schuetz
ATTORNEY

PATENTED JUN 20 1972 3,670,353

INVENTORS
Loren R. Gute, &
George W. Jackson
BY W.A. Schuetz
ATTORNEY

DEMAND VACUUM ACTUATED TAILGATE WIPER SYSTEM

The present invention relates to a window cleaning system, and more particularly to a window cleaning system for cleaning a tailgate window of a station wagon vehicle.

An object of the present invention is to provide a new and improved window cleaning system which is of a relatively simple and economical construction and in which an oscillatory wiper is power actuated through one or its outboard stroke and spring actuated through its return or inboard stroke during each cycle of operation.

Another object of the present invention is to provide a new and improved window cleaning system having a wiper which is oscillatable through outboard and inboard strokes by a drive means which includes a vacuum operated motor having a reciprocable piston, a rotatable reel connected with the wiper for oscillating the same and flexible means operatively connected intermediate its ends to the reel and at its opposite ends with the piston of the vacuum motor and a spring means for biasingly holding the reel and piston in a first position in which the wiper is in its park position, and in which the piston is movable to rotate the reel and wiper through its outboard stroke in opposition to the biasing force of the spring means when vacuum pressure is communicated thereto, the spring returning the wiper through its inboard stroke to its park position when vacuum pressure is no longer communicated to the vacuum motor.

A further object of the present invention is to provide a new and improved window cleaning system having a wiper unit comprising an oscillatory wiper which is power actuated through its outboard stroke by a fluid motor and spring actuated through its inboard stroke, a washer unit having a washer nozzle for directing washer fluid against the window in the path of movement of the wiper and a manually actuatable pump means for delivering pressurized washer fluid to the washer nozzle, and a coordinator means which is responsive to pressurized washer fluid being delivered by the pump means to effect communication between the fluid motor and a pressure source whereby manual actuation of the pump means squirts washer fluid against the window and conjointly effects actuation of the wiper unit.

The advantages of the novel window cleaning system of the present invention are that both the wiper and washer units are operated by merely manually actuating the pump means of the washer unit, that the washer unit wets the glass surface ahead of the wiping action of the wiper and thereby provides for maximum cleaning and minimum loading on the wiper blade and that the wiper unit is of a relatively simple, compact and economical construction.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which.

The present invention provides a novel window cleaning system A for cleaning a window of an automotive vehicle. Although the novel window cleaning system could be used for cleaning various windows of an automotive vehicle, it is particularly susceptible for use in cleaning a tailgate window of a station wagon vehicle. Accordingly, for purposes of description and illustration, the novel window cleaning system will be herein described as being used for the latter purpose.

Figure 1:
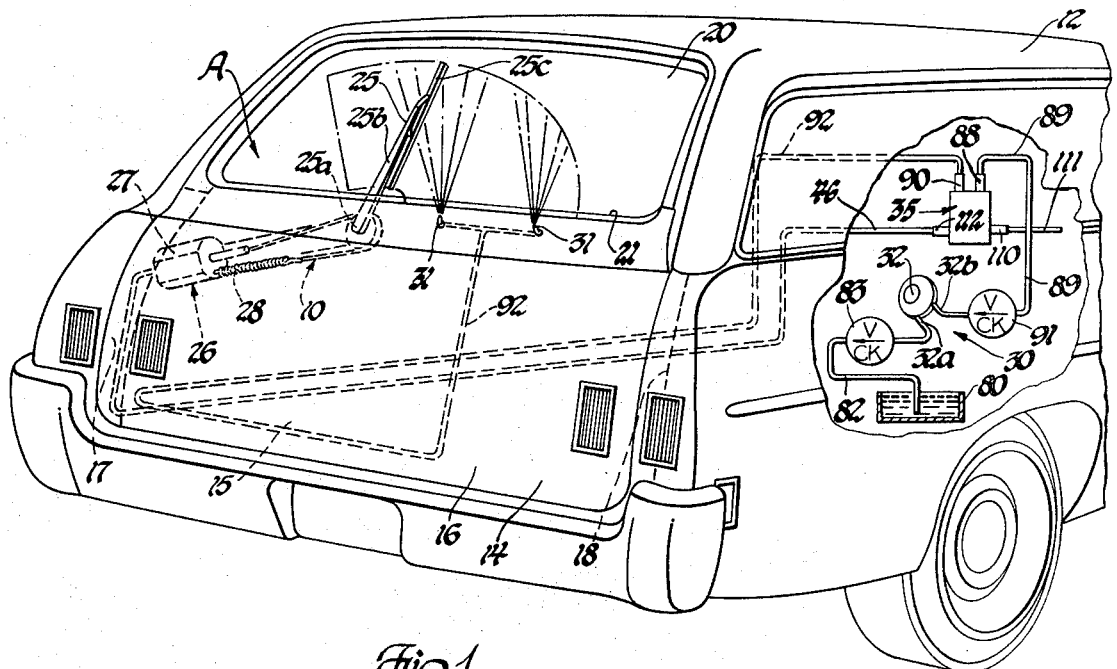
FIG. 1 is a fragmentary rear perspective view of a station wagon vehicle embodying the novel window cleaning apparatus of the present invention.

Referring to the drawings, the novel window cleaning system A is shown embodied in a station wagon vehicle 12. The station wagon 12 includes a conventional tailgate 14 which is supported on hinges (not shown) so as to enable the same to be swung from a generally vertical position, as shown in FIG. 1, to a generally horizontal position as well as enable the same to be swung about its left side edge between a closed position, as shown in FIG. 1, and an open position. The tailgate 14 includes inner, outer and side panels 15–18, respectively, which define a compartment 19. The tailgate 14 also carries a rear tailgate window 20 which is supported therein for movement between a closed position, as shown in FIG. 1, and an open position in which the window is essentially disposed within the compartment 19. The tailgate window 20 is spaced from the outer panel 16 so as to define an elongated slot 21 extending transversely across the tailgate 14 at its upper end.

The window cleaning system A comprises, in general, a window wiper 25 which is oscillatable throughout outboard and inboard strokes across the outer surface of the window 20; a drive means 26 having a fluid motor 27 for moving the wiper 25 through its outboard stroke and a spring means 28 for moving the wiper through its inboard stroke during each cycle of operation; a washer unit 30 having a pair of washer nozzles 31 for delivering washer fluid against the outer surface of the tailgate window 20 and a manually actuatable pump means 32 for delivering washer fluid under pressure to the washer nozzles 31; and a coordinator means 35 for controlling communication between a source of fluid pressure and the fluid motor 27. The coordinator means 35 is responsive to actuation of the manually manipulatable pump means 32 to route the washer fluid to the washer nozzles 31 and to simultaneously effect communication between the pressure source and the fluid motor 27 to actuate the wiper through its outboard stroke. When the pump means 32 is de-actuated the coordinator means 35 blocks communication between the pressure source and the fluid motor 27 and then the spring means 28 returns or moves the wiper 25 through its inboard stroke towards its parked position in which it is disposed within the slot 21 at the upper end of the tailgate 14.

The windshield wiper 25 can be of any suitable or conventional construction and is hereshown as comprising a wiper arm having spring hinge connected inner and outer sections 25a and 25b for biasing a wiper blade assembly 25c carried by the outer section 25b against the outer surface of the tailgate window 20.

The window wiper 25 is adapted to be oscillated through its cycle of operation by the drive means 26. The window wiper 25 is power actuated through its outboard stroke by the fluid motor 27 and is spring actuated through its inboard stroke by the spring means 28 during each cycle of operation. The windshield wiper 25 is in its parked position within the slot 21 to conceal the same when in its inboard stroke end position.

The fluid motor 27 of the drive means 26 is a vacuum operated motor and comprises a reciprocable piston 40 which is slidably received within the complementary shaped housing 41. The piston 40 divides the housing 41 into head end and rod end chambers 43 and 44. The housing 41 is suitably secured to a bracket means 42, the bracket means 42 in turn being suitably secured to the inner wall 15 of the vehicle tailgate 14. The piston 40 and the housing 41 are generally elliptical or oval, as viewed in cross section, so that the housing 41 will fit between the inner and outer walls 15 and 16 of the tailgate 14 and yet have a piston area which is large enough to effect oscillation of the windshield wiper 25 through its outboard stroke when vacuum pressure is communicated to the head end chamber 43 of the housing 41.

The housing 41 has an integral end wall 41a provided with an inlet 45 which is in constant communication with the head end chamber 43 and the coordinator means 35 via a flexible conduit 46. The housing 41 also has a right end wall 48 which is suitably secured thereto and which is provided with an aperture 49 for venting the rod end chamber 44 to atmosphere. Connected to the piston 40 is a piston rod 50 which extends through an aperture 51 in the end wall 48 of the housing 41.

Figure 4:
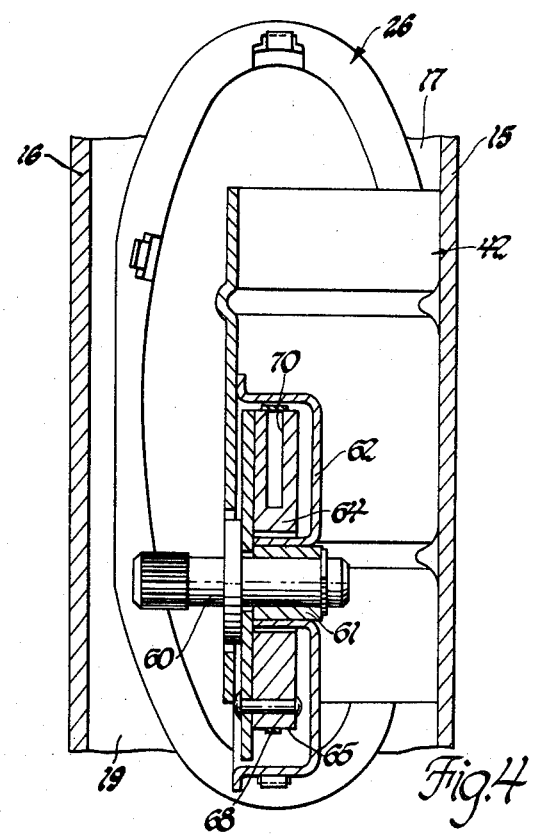
FIG. 4 is an enlarged sectional view taken approximately along line 4—4 of FIG. 2.

The drive means 26 further includes an oscillatable drive pivot 60 to which the wiper 25 is secured. The drive pivot 60 is rotatably supported by a bushing 61 carried by a bracket or housing 62. The housing 62 is suitably secured to the bracket means 42. The drive pivot 60 at its left end, as viewed in FIG. 4, has a knurled end to which the inner arm section 25a of the wiper 25 is non-rotatably attached. Secured to the drive pivot 60 intermediate the ends of the latter is a reel 64 having an outer peripheral surface 65. A flexible means in the form of a flat metallic tape 68 extends partially around the outer peripheral surface 65 of the reel 64. The tape 68 intermediate its ends is secured to the reel via screw 69 and has its opposite ends suitably secured to the piston rod 50 and one end of the spring means 28. The outer peripheral surface 65 of the reel 64 has the first portion 65a which is concentric with the rotatable axis of the drive pivot 60 and a second portion 65b whose radius progressively decreases proceeding from the portion 65a toward a chordal or tangential portion 65c which defines a flat surface. The flat surface 65c is defined by radially extending slot 70 in a portion of the reel 64. The tape has an upper portion 68a, as viewed in FIG. 2, which is wider than the slot 70 and a lower portion 68b having a width which is less than the width of the slot, and for reasons to be noted hereinafter.

Figure 2:
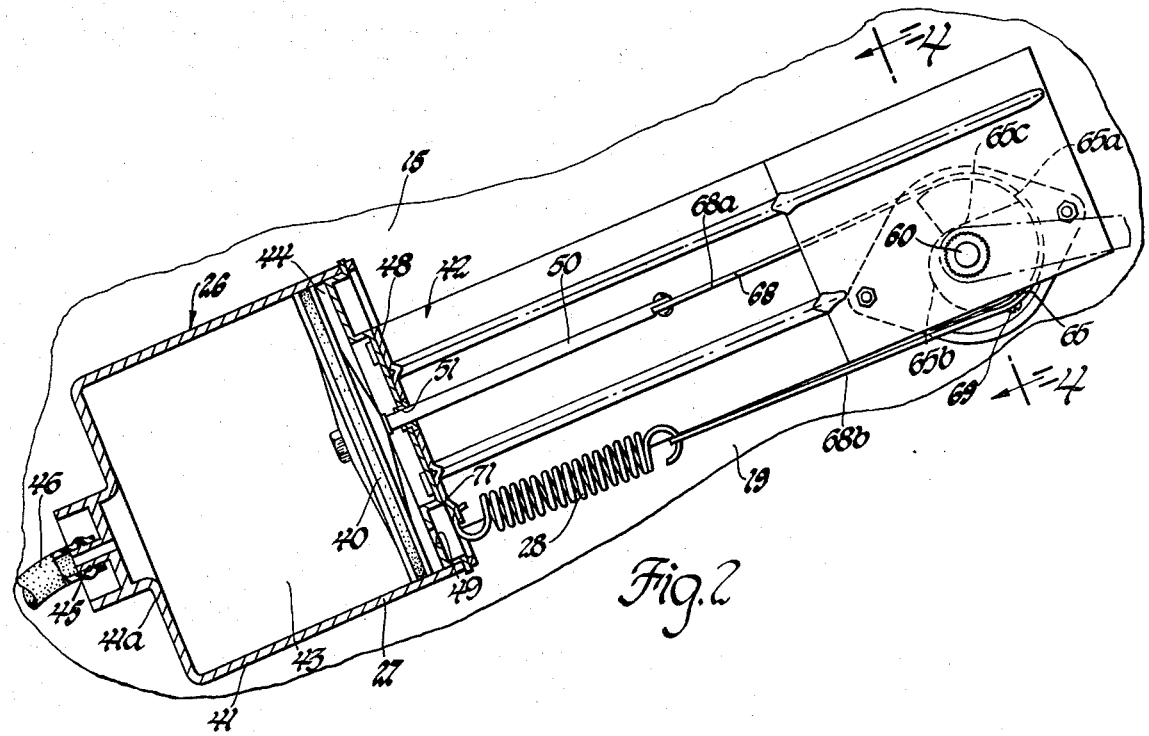
FIG. 2 is an enlarged fragmentary elevational view with parts shown in section of part of the window cleaning apparatus of the present invention.

The piston 40 and the reel 64 are at all times biased toward the position shown in FIG. 2 by the spring means 28. The spring means 28 is in the form of a tension spring having one end connected to the tape 68 and its other end secured to an ear 71 on the end wall 48 of the housing 41. The spring means 28 urges the reel 64 in a clockwise direction which in turn pulls on the piston rod 50 to tend to move the piston 40 toward the right, as viewed in FIG. 2. In this position the wiper 25 which is drivingly connected to the drive pivot 60 is in its inboard or park position in which the wiper is disposed within the slot 21 at the upper end of the tailgate.

Figure 3:
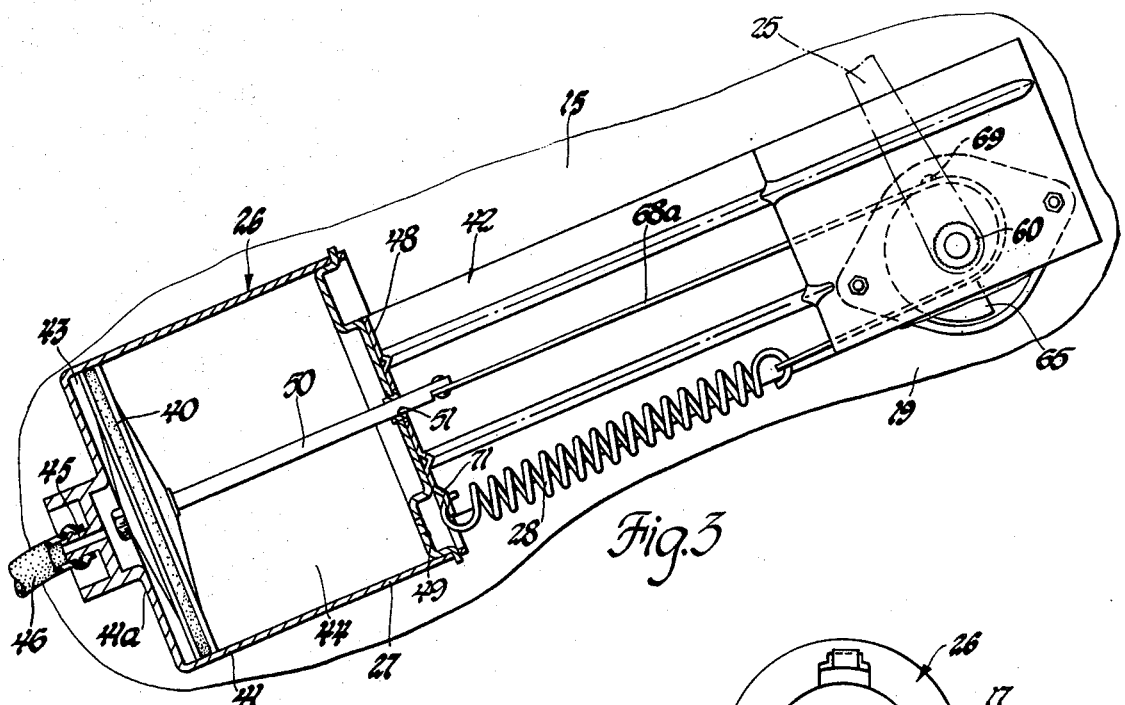
FIG. 3 is a view similar to FIG. 2 but showing different parts thereof in different positions.

The wiper 25 is moved through its outboard stroke when vacuum pressure from a vacuum source, preferably the inlet manifold of the vehicle 12, is communicated to the head end chamber 43 of the housing 41. When vacuum pressure is applied to the chamber 43 the piston 40 is caused to be moved toward the left, which in turn causes the tape 68 to be pulled to rotate the reel 64 in a counterclockwise direction and in opposition to the biasing force of the tension spring 28. As the reel 64 is rotated in counterclockwise direction the wiper 25 is caused to be moved through its outboard stroke. The rate of speed at which the piston 40 is caused to be moved to effectuate movement of the wiper 25 through its outboard stroke is determined by the size of the aperture or bleed orifice 49. As the piston 40 is moved towards the left and the reel 64 rotated in a counterclockwise direction the lower portion 68b of the tape 68 will be wrapped around the peripheral surface portion 65b of the reel 64 and then be received in the slot 70, as shown in FIG. 3.

When the wiper 25 has been moved through its outboard stroke and vacuum pressure is no longer applied to the chamber 43 on the left side of the piston 40, the spring means 28 will move the wiper 25 through its return or inboard stroke toward its park position. That is, the spring means 28 will cause the reel 64 to be rotated in a clockwise direction which in turn causes the tape 68 to move the piston 40 toward the right. The rate of speed of the return movement of the wiper is dependent upon the size of the bleed orifice 49.

The washer unit 30 for squirting washing fluid against the outer surface of the tailgate window 20 and in the path of movement of the wiper 25 is shown schematically in FIG. 1 of the drawings. It comprises a reservoir 80 for containing a supply of washing fluid. The reservoir 80 is in communication with the inlet 32a of the pump 32 via a conduit 82. A suitable check valve 83 is provided to allow fluid to flow from the reservoir 80 to the pump 32, but not vice versa.

The pump 32 is preferably a foot actuated bellows pump of any suitable or conventional construction and also includes an outlet 32b which is in communication with an inlet 88 of the coordinator means 35 via a conduit 89. A suitable check valve 91 is provided to allow washer fluid to flow toward the inlet 88 of the coordinator means 35, but not vice versa. The coordinator means 35 also has an outlet 90 which is in communication with the washer nozzles 31 via conduit means 92. The washer nozzles 31 are carried by the tailgate 14 adjacent the upper end of the latter.

In operation, when the foot actuated bellows pump 32 is depressed washer fluid is discharged under pressure through conduit 89 and past the check valve 91 to the coordinator means 35 and then via conduit means 92 to the nozzles 31. The nozzles 31 emit the washer fluid in jet form against the outer surface of the tailgate window 20. When the operator releases the foot operated bellows pump 32, it will expand due to its inherent elastic forces and cause water to be drawn from the reservoir via conduit 82 and past the check valve 83 into the interior of the bellows pump 32.

The coordinator means 35 for controlling communication between the inlet manifold (not shown) and the vacuum motor 27 is responsive to operation of the pump means 32. The coordinator means 35 comprises a housing means 100 having a main body portion 101 and end parts 102 and 103 suitably secured to the main body portion 101. The main body portion 101 has a transverse wall 104 intermediate its ends which divides the main body portion into a pair of chambers 105 and 106 which are in communication with each other via an aperture 107 in the transverse wall 104. The chamber 106 is in communication with the inlet manifold of the vehicle via an inlet 110, the inlet in turn being in communication with the inlet manifold via flexible conduit 111. The chamber 105 is in communication with the chamber 43 of the fluid motor 27 via outlet 112 and the conduit 46. The chamber 105 is also in communication with the atmosphere via port 114 in the end wall 103.

Figure 5:
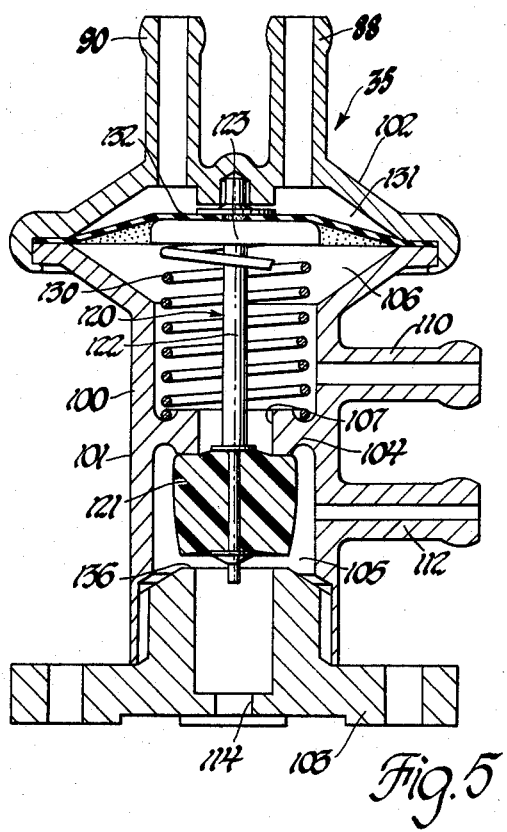
FIG. 5 is an enlarged cross-sectional view of part of the windshield cleaning system shown in FIG. 1.

The coordinator means 35 further includes a valve means 120 which is operable to either block or unblock communication between the inlet 110 and the outlet 112. The valve means 120 comprises a valve seat 121 made from a suitable flexible or rubber material, a valve stem 122 having one end connected to the valve seat 121 and its other end connected to an end plate 123. The valve stem 122 extends through the aperture 107 in the transverse wall 104. The valve means 120 is biased by a compression spring 130 toward a first position, as shown in FIG. 5, in which the seat 121 is in engagement with the transverse wall 104 to block communication between the inlet and outlet 110 and 112 and to establish communication between the atmosphere and the outlet 112. The compression spring 130 has one end in abutting engagement with the transverse wall 104 and its other end in abutting engagement with the end plate 123.

Figure 6:
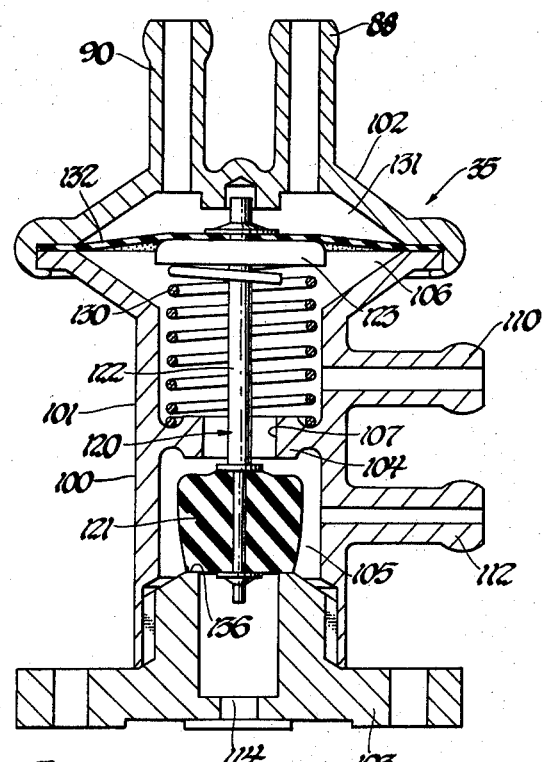
FIG. 6 is a view similar to FIG. 5 but showing different parts thereof in different positions.

The valve means 120 is movable from its first position, as shown in FIG. 5, towards its second position, as shown in FIG. 6, by a valve actuator 132 when the latter is deflected downwardly, as viewed in the drawings. The valve actuator 132 is in the form of a resilient diaphragm whose outer peripheral edge is sandwiched between the upper end of the body portion 101 and the end part 102. The diaphragm 132 is in engagement with the end plate 123 and its lower and upper sides are in communication with the chamber 106 and a chamber 131. When the diaphragm 132 is deflected downwardly in opposition to the biasing force of the compression spring 130, the valve means 120 is moved downwardly to its second position in which the valve seat 121 seats against the surface 136 on the end part 103 to block communication between the atmosphere and the outlet 112 and in which communication is established between the inlet and outlet 110 and 112.

The valve means 120 is adapted to be moved from its first position, as shown in FIG. 5, towards its second position, as shown in FIG. 6, in response to actuation of the foot operated bellows pump 32. The outlet 32a of the foot operated pump is in communication with the chamber 131 via the inlet 88 in the end part 102. Also the washer nozzles 31 are in communication with the chamber 131 via conduit means 92 and outlet 90 in the end part 102.

When operation of the window cleaning system A is desired the operator need merely depress the foot operated bellows pump 32. Depression of the pump 32 causes washer fluid under pressure to be supplied via conduit 89 and inlet 88 to the chamber 131 of the coordinator means 35. The fluid entering the chamber 131 of the coordinator means 35 is routed through the outlet 90 and thence via conduit means 92 to the washer nozzles 31 to squirt washing fluid against the outer surface of the window. The pressurized fluid upon entering the chamber 131 also causes the resilient diaphragm 132 to be deflected downwardly towards the position shown in FIG. 6, which in turn causes the valve means 120 to be moved to its second position, as shown in FIG. 6. When the valve means 120 is being moved to its second position, the inlet and outlet 110 and 112 are in communication with each other which causes vacuum pressure to be applied to the chamber 43 on the left side of the piston 40. This causes the wiper 25 to be actuated through its outboard stroke, and in the manner hereinbefore described.

When the operator releases his foot from the foot operated bellows pump the compression spring 130 returns the valve means 120 and valve actuator 132 towards the position shown in FIG. 5 in which the valve seat 121 blocks communication between the inlet and outlet 110 and 112 to prevent vacuum pressure from being applied to the left side of the piston 40. When this occurs the spring 28 will return the wiper 25 through its inboard stroke towards its park position, and in a manner hereinbefore described.

The design of the window cleaning system is such that upon depression of the foot operated bellows pump 32, washer fluid is squirted against the outer surface of the window prior to the wiper being moved through its outboard stroke. This insures that washer fluid has wetted the window prior to the wiping action so as to minimize loading of the wiper and to provide for maximum cleaning. Also, it should be noted that the wiper unit cannot be operated unless the washer unit is operated. It should be further noted that since both wiper and washer operation are controlled by merely depressing a foot operated bellows pump, the operator of the vehicle need not take his hand off the steering wheel.

Figure 7:
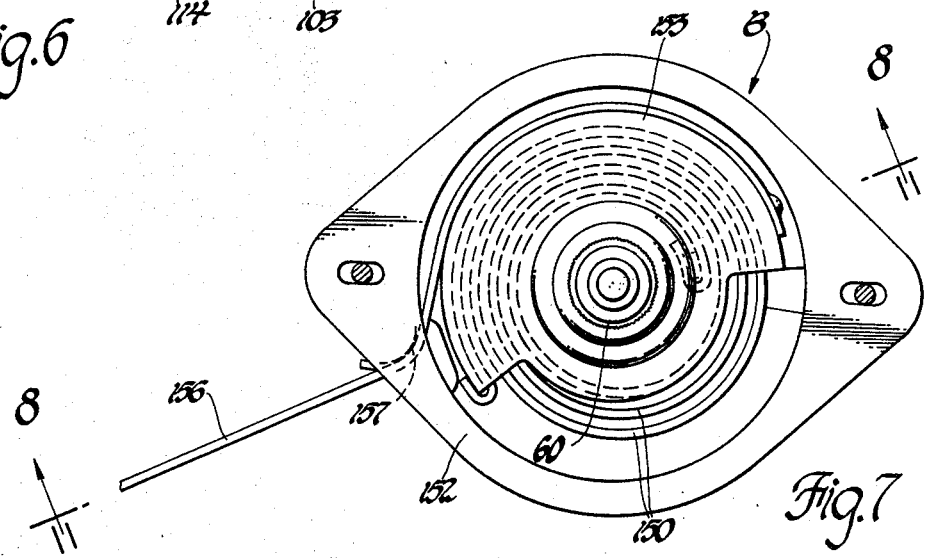
FIG. 7 is an enlarged elevational view of an alternate embodiment of a windshield cleaning system of the present invention.
Figure 8:
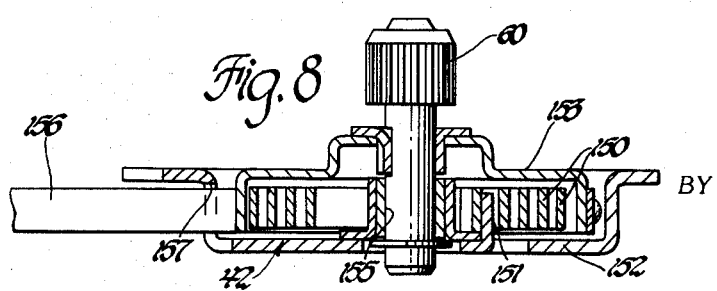
FIG. 8 is a cross-sectional view taken approximately along line 8—8 of FIG. 7.

FIGS. 7 and 8 show an alternate embodiment of a window cleaning system B of the present invention. This embodiment is substantially identical to that previously described and parts which are the same will be given the same reference numerals. It differs from the cleaning system A in that the tension spring 28 and the reel 64 are eliminated and a spirally wound spring 150 having its inner end connected to an upstanding tang 151 of a stationary cup-shaped housing 152 and its outer end connected to a rotatable reel or cup-shaped housing 153 is provided. The housing 152 is secured to the bracket means 42. The housing 153 is drivingly connected to the drive pivot 60, the drive pivot 60 in turn being rotatably supported by a bushing 155 carried by the housing 152. Secured to the outer side wall of the housing 153 is one end of a flexible tape 156, the other end of the tape 156 being connected to the piston rod 50 of the fluid motor 27. The tape 156 extends through an opening 157 in the side wall of the housing 152.

When the wiper 25 is in its park position, the spirally wound spring 150 is in its radially expanded condition in which it biasingly holds the wiper 25 in its park position and the piston 40 in its rightmost position. When vacuum pressure is applied to chamber 43 of the fluid motor 27 the piston is drawn to the left which causes the tape 156 to pull on the spring 150 to radially or spirally contract the spring 150. When vacuum pressure is no longer applied to the left side of the piston 40, the spirally wound spring 150 unwinds and rotates the drive pivot 60 to cause the wiper 25 to be rotated through its inboard stroke.

Although the illustrated embodiments hereof have been described in great detail, it should be apparent that certain modifications, changes, and adaptations may be made in the illustrated embodiments, and that it is intended to cover all such modifications, changes and adaptations which come within the spirit of the present invention.

What is claimed is:

1. A window cleaning system for cleaning a window of an automotive vehicle comprising: a window wiper which is adapted to be supported by the vehicle for oscillatory movement through first and second strokes across the outer surface of the window; a drive means for moving the wiper through its strokes, said drive means including a fluid motor for moving the wiper through its first stroke when a source of fluid pressure is communicated thereto and a spring means for moving the wiper through its second stroke when fluid pressure is not communicated to the fluid motor; a washer unit for washing the vehicle window, said washer unit including a washer nozzle for directing washer fluid against the window in the path of movement of the wiper and a pump means for delivering washer fluid under pressure to the washer nozzle; and a pressure responsive coordinator means operatively connected with said pump means for controlling communication between the source of fluid pressure and the fluid motor, said coordinator means being operable to prevent communication between the pressure source and the fluid motor when the pump means is not delivering washer fluid under pressure to the nozzle, but being operable in response to pressurized fluid being delivered by the pump to establish communication between the source of fluid pressure and fluid motor whereby in response to actuation of the pump means washer fluid is squirted against the window and said wiper means is actuated through its first stroke.

2. A window cleaning system as defined in claim 1 wherein said coordinator means comprises a housing, a valve means movable between first and second positions in which it blocks and unblocks communication between the source of fluid pressure and said fluid motor, respectively, and a movable valve actuator connected to said valve means, said valve actuator being biased toward a normal position in which it holds said valve means in its first position, but being movable from its normal position to move said valve means toward its second position when pressurized fluid is applied to one side thereof; said washer nozzle being in communication with said one side of said valve actuator and said pump means having its outlet in communication with said one side of said valve actuator.

3. A window cleaning system as defined in claim 2 wherein said fluid motor is vacuum operated and said source of pressurized fluid for operating said fluid motor is adapted to be an inlet manifold of the vehicle.

4. A window cleaning system as defined in claim 1 wherein said fluid motor includes a piston which is reciprocably supported for movement between first and second positions, said piston having one side vented to atmosphere and its other side in communication with said coordinator means, wherein said drive means comprises a rotatable drive pivot to which the wiper is secured, a reel fixedly secured with said drive pivot and flexible means extending around said reel and having one end secured to said piston and its other end secured to said spring means, said spring means biasing said piston toward its first position, said piston being movable in opposition to the biasing force of said spring means from its first position toward its second position to rotate said wiper through its first stroke when said source of pressurized fluid is in communication with its other side.

5. A window cleaning system for cleaning a tailgate window of a station wagon vehicle having a tailgate comprising: a window wiper which is adapted to be supported by the vehicle tailgate for oscillatory movement through first and second strokes across the outer surface of the tailgate window; a drive means for moving the wiper through its strokes, said drive means including a fluid motor for moving the wiper through its first stroke when a source of fluid pressure is communicated thereto and a spring means for moving the wiper through its second stroke when fluid pressure is not communicated to the fluid motor; a washer unit for washing the vehicle window, said washer unit including a washer nozzle for directing washer fluid against the window in the path of movement of the wiper and a pump means for delivering washer fluid under pressure to the washer nozzle; and a pressure responsive coordinator means operatively connected with said pump means for controlling communication between the source of fluid pressure and the fluid motor, said coordinator means being operable to prevent communication between the pressure source and the fluid motor when the pump means is not delivering washer fluid under pressure to the nozzle and being operable in response to pressurized fluid being delivered thereto by the pump to establish communication between the source of fluid pressure and fluid motor whereby in response to actuation of the pump means washer fluid is squirted against the window and said wiper means is actuated through its first stroke.

6. A window cleaning system for cleaning a tailgate window of a station wagon vehicle having a tailgate comprising: a window wiper which is adapted to be supported by the vehicle tailgate for oscillatory movement through outboard and inboard strokes across the outer surface of the tailgate window; a drive means for moving the wiper through its strokes, said drive means including a vacuum operated motor for moving the wiper through its outboard stroke when vacuum pressure is communicated thereto and a spring means for moving the wiper through its inboard stroke when vacuum pressure is not communicated to the vacuum motor; said vacuum operated motor including a piston which is reciprocably supported for movement between first and second positions, said piston having one side vented to the atmosphere and its other side in communication with said vacuum source, a rotatable drive pivot to which the wiper is secured, a reel fixedly secured with said drive pivot so as to be rotatable therewith, and a flexible means extending around said reel and having one end secured with said piston and its other end secured with said spring means, said spring means biasing said piston towards its first position, said piston being movable in opposition to the biasing force of said spring means from its first position towards its second position to rotate said wipers through its first stroke when vacuum pressure is communicated with the other side of said piston, said spring means returning said piston from its second position toward its first position when vacuum pressure is relieved from said vacuum operated motor, and control means for controlling communication between said vacuum pressure source and said vacuum operated motor, a washer unit for washing the vehicle window, and control means for controlling operation of said washer unit and said drive means.

7. A window cleaning system as defined in claim 6 and wherein said washer unit including a washer nozzle for directing washing fluid against the window in the path of movement of the wiper and a pump means for delivering washer fluid under pressure to the washer nozzle; and wherein said control means comprises a pressure responsive coordinator means operatively connected with the pump means for controlling communication between the vacuum source and the vacuum operated motor, said coordinator means comprising a housing, a valve means movable between first and second positions in which it blocks and unblocks communication between the vacuum source and the vacuum operated motor, respectively, and a movable valve actuator connected with said valve means, said valve actuator being biased toward a normal position in which it holds said valve means in its first position, but being movable from its normal position to move said valve means towards its second position when pressurized washer fluid from said pump means is applied to one side thereof, said washer nozzle being in communication with said one side of said valve actuator and said pump means having its outlet in communication with said one side of said valve actuator whereby when said pump means is actuated washer fluid is squirted against the window and the wiper means is actuated through its outboard stroke.

8. A window cleaning system as defined in claim 7 wherein sad spring means is a tension spring.

9. A window cleaning system as defined in claim 1 wherein said spring means is a spirally wound spring.

* * * * *